Nov. 25, 1958  E. A. MACHA  2,861,530
METHOD AND APPARATUS FOR MAKING METAL ARTICLES
Filed March 3, 1954
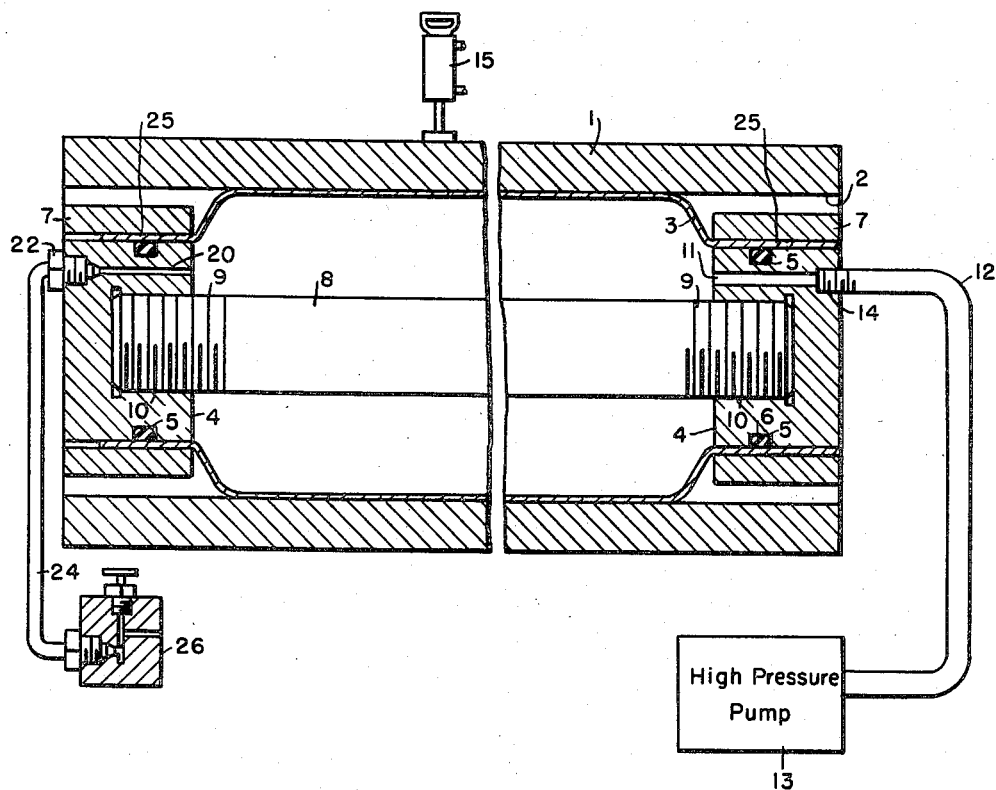
WITNESSES:
INVENTOR
Edward A. Macha.
BY
ATTORNEY

United States Patent Office 2,861,530
Patented Nov. 25, 1958

2,861,530
METHOD AND APPARATUS FOR MAKING METAL ARTICLES

Edward A. Macha, Wilmerding, Pa., assignor to Westinghouse Electric Corporation, East Pittsburgh, Pa., a corporation of Pennsylvania Application March 3, 1954, Serial No. 413,869

4 Claims. (Cl. 113—44)

My invention relates to a new and improved method and apparatus for producing metal shapes, and, more particularly, to a method and apparatus for producing thin walled metal tubes having close tolerances and a uniform wall thickness.

For certain applications, a close tolerance tube having a uniform wall thickness is particularly desired in order to obtain a device which is operative. Thus, for example, in the use of submerged motors for pumping fluids where it is undesirable for the fluid to contact either the rotor or the stator, or both, it is necessary that either the rotor or stator, or both, be sealed within a metal chamber which is capable of withstanding the ambient pressures under which the fluid is circulated. In such circumstances, a thin-walled tube extending through the air gap is used to seal the rotor or stator, or both, and as it is necessary that the air gap between the rotor and stator be maintained quite small and uniform, without a close tolerance uniform wall thickness tube, such an air gap would be impractical.

The term "thin wall tube," as applied to available commercial tubing, indicates a tube having a wall thickness varying from 0.012 inch to 0.025 inch and having an ovality tolerance of 0.065 inch per foot of length. Heretofore, producing uniform thin walled metal tubes to close diameter tolerances has entailed machining tube blanks, which were formed from a variety of processes, such as drawing, or by various machining practices. By my method however, tubes having a wall thickness of less than 0.012 inch can also be produced, which is beyond the range of available commercial tubing. As can readily be appreciated in machining to close tolerances, the machining time is excessive and it requires accurate machine tools and skilled labor. Such costs result in a product which is expensive to produce to such an extent that any production volume is impractical. The cost of such machined tubes is further increased due to the element of human failure and machine and material faults which are inherent in such precision work. Aside from the cost disadvantage of machined tubes, they also have undesirable physical characteristics. Unfortunately, the stresses induced by machining cannot be relieved by annealing a close tolerance product, as such annealing would destroy the tolerances. For the same reason hard spots or inclusions within the tube cannot be relieved by annealing. The machining streses and the effect of inclusions are particularly undesirable when such tubes are subjected to internal pressure as they substantially reduce the pressure that the tubes can be subjected to. Nor is it practical to produce tubes of any substantial length having a uniform thin wall thickness and close tolerance diameters by any other method such as deep drawing or by rolling sheet material and welding a longitudinal seam, as such processes are not adapted to thin material due to the limitations of wall thickness with reference to the diameter of the tube.

Accordingly, one object of my invention is to provide a new and improved method for forming metal shapes.

Another object of my invention is to provide a new and improved method of forming metal shapes having a uniform thin wall thickness.

Still another object of my invention is to provide a new and improved method for producing cylindrical tubes having a substantially uniform thin wall thickness.

Another object of my invention is to provide a new and improved cylindrical tube having a thin wall held substantially uniform in thickness along its entire length.

Still another object of my invention is to provide apparatus for producing thin wall metal shapes, which is inexpensive to manufacture.

Another object of my invention is to provide apparatus for producing thin wall metal shapes having a uniform wall thickness which does not require any extensive or expensive components.

Still another object of my invention is to provide apparatus for producing thin wall tubes having uniform wall thickness.

These and other objects of my invention will become more apparent upon consideration of the following detailed description of the method, apparatus and shapes produced in accordance with my invention, when taken in conjunction with the attached drawing in which is illustrated a cross sectional view of a cylinder in which a tube is positioned having plugs at each of its ends, to one of which a hydraulic connection is made.

Broadly speaking, my invention entails placing a hollow blank which is to be formed, and which has its ends plugged within a hollow stationary member, and thereafter expanding the hollow blank by pressure. Such expansion may be in stages, so that the blank is ultimately expanded into intimate engagement with the stationary member. As a consequence of such expansion, the hollow member is stressed beyond its elastic limit and yielding of the material occurs until a final shape having a uniform thin wall thickness is obtained.

For the purpose of better understanding my invention, the following description has reference to a relatively long cylindrical tube on the order of 60 to 70 inches in length, as a typical illustration of the invention. It will be realized, however, that the principles of my invention are equally applicable to producing other lengths and shapes, and that in such production the apparatus required may vary essentially only as to size.

As has been indicated, there is no practical commercial method whereby tubes having a wall thickness of less than about 0.018 inch can be economically produced. Accordingly, my method starts with a tube blank 3 (shown finally expanded in Fig. 1) having an initial thickness of approximately 0.018 inch. It is immaterial for the purposes of my method in what manner tube 3 is produced. It has been found practical, however, to utilize 0.018 inch 300 series stainless steel which is rolled in the form of a tube and welded along its longitudinal seam. However, similar steel tubing produced by deep drawing having a wall thickness of substantially 0.018 inch is equally suitable for my method.

A pair of discs 4, which may be formed from any suitable material such as steel which is capable of withstanding the operating pressures of my method and which may be machined, are provided each having a peripheral groove 5 in which a resilient O-ring 6 may be located. The discs 4 are adapted to be located in each end of the tube blank 3. It has been found that a neoprene O-ring material is satisfactory for my purposes, although other synthetic elastomer materials may be used. O-rings 6 extend slightly beyond the discs 4 and as they are resilient, it is not necessary that discs 4 be machined to a high degree of accuracy on their outside diameter, but they may be machined below the lower limits of the tolerances on the internal diameter of the tube blank 3.

To further support the tube blank 3 at each of its ends, outside support rings 7 are provided which may be formed from any suitable material, such as steel. The internal diameter of the support rings 7 is machined to closely approximate the outside diameter of tube blank 3 so that they may be manually freely slid over the outside of the ends of tube blank 3, or they may have a light pressure fit. This entire assembly is held together in end-to-end relationship by means of a tie-rod 8, which may also be formed from any suitable material such as steel. Tie-rod 8 is provided with screw threads 9 at each of its ends which threadedly engage threaded openings 10 in each of the discs 4. If desired, however, other types of fastening means may be employed to hold the assembly together. It will also be noted that one of the discs 4 is provided with an opening 11 to which is connected the high pressure line 12 of a hydraulic pump 13. The high pressure line 12 may be secured to the disc 4 in any suitable manner, such as by threadedly engaging the enlarged threaded portion 14 of opening 11. The other disc 4 is provided with an opening 20 in the outer end of which is threadedly secured the high pressure fitting 22 for a conduit 24 leading to a high pressure valve 26. Valve 26 may be one of various commercially supplied high pressure valves and is utilized to release air which is entrapped within the tube blank 3 when tube blank 3 is filled with a suitable fluid, as hereinafter discussed.

Although this assembly as described may be made in various ways, it has been found practical to make the assembly in the following manner: first place O-rings 6 in grooves 5 of discs 4, then secure discs 4 to each end of tie-rod 8, then insert the tube blank 3 over discs 4 and tie-rod 8 thereby slightly compressing O-rings 6, then slide support rings 7 over each end of the tube blank 3 and, if desired for the final expansion of tube 3, place this entire assembly within cylinder 1, and then secure pressure line 12 to opening 11.

By this assembly, pump 13, line 12, opening 11, tube blank 3, discs 4, and O-rings 6 form a hydraulically sealed system. In performing my method, the tube blank 3 is initially filled, through opening 11 in disc 4, with water or any other suitable fluid before the high pressure line 12 is attached to the threaded portion 14 of opening 11. If desired, however, tube blank 3 may be filled through opening 20 in the other disc 4 in order to eliminate breaking the pump connection 14. Thereafter, by means of the pump 13 hydraulic pressure is increased within the hydraulically sealed system. As is well known in the hydraulic art a force which is applied through a hydraulic system is transmitted uniformly in all directions and when such force produces a stress in tube 3 beyond the elastic limit of the material from which tube 3 is formed, tube 3 will be permanently deformed to a dimension other than its initial dimension.

As is also well known in the art of metal forming, the mechanical deformation or cold-working of a ductile metal produces strain hardening within the metal which decreases the ductility of the metal. For instance, where a large percentage of deformation is required, the decrease in ductility may be sufficient that rupture or failure of the metal will occur before the full deformation is obtained. In order to prevent such a failure, deformation may be accomplished in stages and the metal may be annealed between successive stages to relieve the stresses induced by the deformation and restore the ductility of the metal.

In practicing my invention it has been found in most cases that in order to obtain the desired wall thickness of the enlarged tube 3 the percentage increase of the outside diameter of tube 3 is so large that failure of the metal may occur. Thus, by way of illustration, a tube having an initial wall thickness of 0.018 inch, and a nominal outside diameter of 2.7 inches may be formed by my method to a tube having a wall thickness of 0.012 inch and a nominal outside diameter of approximately 4.6 inches, which is a 73% increase in diameter. For such a high percentage increase it is desirable that the tube be enlarged in increments and annealed between each enlargement in order to relieve the effects of the strain hardening. If this is done there is no requirement that the full percentage of diameter increase obtainable without danger of rupture be taken in the first enlargement. With my method and apparatus the percentage diameter increase can be taken evenly between two, three or four stage enlargements or, if desired, in uneven enlargement stages.

Returning to the 0.018 inch to 0.012 inch example, my method is preferably practiced in the equal enlargement stages, each resulting in an approximately 20% increase in outside diameter. Starting with a nominal outside diameter of 2.7 inches, a first stage 20% increase results in a 3¼ inches nominal outside diameter at which point the first stage enlarged tube is annealed to relieve the induced stresses in the tube. A second stage 20% increase results in a nominal outside diameter of 3⅞ inches which is followed by an anneal, and a third stage 20% enlargement resulting in a nominal outside diameter of 4¹¹⁄₁₆ inches.

Regardless of the number of enlargement stages that may be used by my method any stage of enlargement can be performed with my apparatus which forms the hydraulically sealed system. It will be noted that the ends 25 of the initial tube blank 3 are restrained and therefore are not enlarged or reduced in thickness. Accordingly, discs 4 and supports 7 can be used for any enlargement stage. Also in performing my method, initial expansion stages may be carried on without sizing cylinder 1, as once the percentage diameter enlargement for a given stage is determined, the final diameter desired for that stage can be established upon simple C gauges or adjustable micrometers. Thereafter, the gauge may be inserted over the enlarged diameter until a close fit is obtained, at which time the hydraulic pressure may be relieved to prevent further enlargement of the tube. The final stage of enlargement can also be performed in this same manner; however, as can be appreciated the degree of control by using gauges is not as accurate as a restraining cylinder. Thus, the final enlargement is preferably performed within the bore of the sizing cylinder 1.

Referring to the drawing, it will be noted that the stationary sizing cylinder 1, which may be formed from any suitable material, such as steel, which is capable of withstanding the operating pressures of my method, is provided having an internal circular bore 2 into which the tube blank 3, which is to be formed by my method, is positioned. Cylinder 1 may be provided with any one of a variety of standard handling means, such as eye bolts (not shown) threadedly engaging cylinder 1, and may be placed horizontally or vertically on any suitable working surface, such as a bedplate. As will become apparent from the description of my method, in order to obtain a smooth surface upon the outside diameter of the expanded tube, bore 2 of cylinder 1 is preferably accurately machined to a close tolerance and honed to a smooth surface.

Inasmuch as the radial expansion movement of the tube 3 is limited by the bore 2 of cylinder 1, the yielding of the tube 3 is limited once tube 3 has expanded into intimate engagement with the bore 2 of cylinder 1. Thereafter at this point the stresses developed within tube 3 may be relieved by applying a vibratory force, by any suitable means such as an air hammer 15, operating on the outer surface of tube 1. This method of relieving such stresses is more completely described and claimed in the copending application of Edward M. Macha and Bernard W. Schuff, Serial No. 401,236, filed December 30, 1954, and which has been assigned to the same assignee as this invention.

From this description of my method and apparatus, it is believed that the manner in which tube 3 is formed can readily be understood. Primarily, as the hydraulic pressure is increased, stresses will develop in tie-rod 8 and the tube blank 3 which will resist enlarging of the hydraulic chamber longitudinally. In order that only tube 3 expands, it is obvious that tie-rod 8 must be of sufficient area so that the unit stress developed therein by the hydraulic pressure does not exceed the elastic limit of the material of tie-rod 8. Thus, the entire assembly will remain stationary until stresses are developed within the side walls of tube 3 which are beyond the elastic limit of the material of tube 3. As has been indicated, the inside of tube 3 at each of its ends is engaged by the compressed O-rings 6 to seal off the ends of the tube and to frictionally hold the tube in position. Rings 7 also hold the end portions of tube 3 against any lateral expansion. As the stresses within tube 3 are increased, the tube 3 will expand to attempt to relieve such stresses. Primarily, such relief will occur by tube 3 expanding radially, however, tube 3 may also move over the O-rings 6 and shorten somewhat lengthwise, and in order to compensate for such shortening of tube 3, O-rings 6 are placed adjacent the hydraulic chamber. After each stage of expansion, the hydraulic pressure is relieved by disconnecting the line 12 from opening 11 and the fluid drained through opening 11 or 20 from the hydraulic chamber. Thereafter, support rings 7, discs 4 and tie-rod 8 are removed from the expanded tube 3.

Due to the character of stressed metal, if the induced stresses are not relieved in some manner, such as by hammer 15, after the pressure is relieved, tube 3 will tend to contract; however, as tube 3 has been stressed beyond its elastic limit, a permanent set is obtained and tube 3 will reach a stable condition between its initial and expanded dimensions which is close to its enlarged dimensions. It can be realized that for a given tube 3 the final enlarged dimension of the tube can be varied by utilizing a variety of cylinders 1 having various inside diameters. It has been found that by my method the wall thickness of tube 3 is reduced uniformly substantially along its entire length, and that by such process there is a rearrangement of the molecular structure of tube 3 which increases the strength properties of tube 3. In the given example, the wall thickness has varied from plus or minus 0.001 inch from the nominal thickness of 0.012 inch which, for practical purposes, constitutes a uniform wall thickness.

It is to be noted that discs 4, support rings 7, and tie-rod 8 may be made by simple machining processes and that they are relatively simple parts. Cylinder 1 is the only part of my apparatus which requires any extensive machine work in that bore 2 must of necessity be smooth as the tube 3 is forced into engagement with cylinder 1. It is also believed obvious that disc 4, supports 7 and tie-rod 8, having been initially determined experimentally as to their proper size, may easily be duplicated and reused.

Referring again to the previous example, the following chart illustrates typical results obtainable by my method:

|  | Tube Blank, inches | After 1st stage Expansion, inches | After 2nd stage Expansion, inches | Final Expansion, inches |
| --- | --- | --- | --- | --- |
| Nominal outside diameter | 2.7 | 3.24 | 3.888 | 4.666 |
| Average Wall thickness | 0.018 | 0.0155 | 0.0135 | 0.0120 |

This represents an overall enlargement of the diameter of approximately 73% and an overall reduction of wall thickness of 33⅓%. It should particularly be noted that the percentage increase of diameter per stage is greater than the percentage decrease per stage in wall thickness. Such difference is larger when the final stage is performed as a higher degree of control is desired in order to insure that the desired wall thickness is obtained. As a consequence of this fact it can be seen that the outside diameter can vary through a fairly substantial dimension range without materially affecting the wall thickness. Thus, the limited effect of recovery of the tube 3 after the pressure has been relieved does not affect the wall thickness to any substantial degree. In the example stated, the recovery of the enlarged tube 3 on its outside diameter has varied from 0.012 inch to 0.015 inch for each stage. Thus, with reference to the final expansion, the outside diameter has been increased 4.666 inches minus 3.888 inches or 0.778 inch (approximately ¾ of an inch) while the wall thickness has been decreased from 0.0135 inch minus 0.0120 inch, or 0.0015 inch. Obviously, a 0.0015 inch recovery on the diameter of tube 3 will have little effect upon the wall thickness. Also it will be realized that the outside diameter of tube 3 may vary over a substantial range while the wall thickness remains substantially uniform.

Inasmuch as the recovery of the diameter of tube 3 has little effect upon the wall thickness, if desired, the residual stresses within the enlarged tube 3 may be relieved by applying a force such as a vibratory force to the cylinder 1. Such a method of relieving residual stresses is more particularly described and claimed in the previously identified copending application of Edward M. Macha and Bernard W. Schuff.

Although only one form of apparatus used in producing thin wall tubing is heretofore described and shown in the drawing, it is to be realized that the showing is illustrative only and that the apparatus may take other forms within the scope of my invention. Also, it should be borne in mind that although the discussion heretofore has been with reference to a circular tube member 3, my method is equally applicable to forming other such standard shapes such as triangles, rectangles, and polyhedrons. It is also obvious that ductile metals other than steel may be formed in a similar manner and other pressure medium than a liquid may be utilized. It is also believed apparent that the ends of the tube 3 which have been restrained by the support rings 7 may be cut off by any suitable mechanical process, such as sawing, and discarded in order to obtain a uniform cross-sectioned end product.

Having described a preferred embodiment of the invention in accordance with the patent statutes, it is desired that the invention be not limited to the specific construction illustrated inasmuch as it will be apparent that many modifications in addition to those specifically pointed out herein may be made without departing from the spirit and scope of my invention. Accordingly, it is desired that this invention be interpreted as broadly as possible and that it be limited as broadly as possible and that it be limited only as required by the prior art.

I claim as my invention:

1. A method for expanding a tubular blank to reduce the wall thickness thereof, said method comprising the steps of rigidly connecting a pair of spaced end members, the outer peripheries of said end members being shaped to fit relative closely within the respective end portions of said blank, providing resilient sealing means on each of said outer peripheries, inserting said end members within said blank such that said blank end portions sealingly engage said sealing means respectively to seal said blank to said end members, restraining the radial expansion of said end portions with a closely fitting ring member placed over each said end portions to maintain said sealing engagement during expansion of said blank, partially expanding the portion of said blank intermediate said members by force applied internally of said blank, inserting said tubular blank, said end members and said ring members within a one-piece tubular die chamber having an interior contour larger than said ring members and said blank but the same as the final desired external contour of said blank intermediate portion, and applying additional force internally of said tubular blank to expand said intermediate portion into engagement with said die chamber.

2. A method for expanding a tubular blank to reduce the wall thickness thereof, said method comprising the steps of rigidly and spacedly connecting a pair of end members adapted to fit relatively closely within the ends of said tubular blank, sealing the end portions of said blank to said end members respectively, restraining the radial expansion of said end portions with an annular member placed over each said end portions to maintain said sealing during expansion of said blank, expanding in a plurality of successive stages the portion of said blank intermediate said end members by force applied internally of said blank, relieving the stresses induced by each stage of expansion between successive expansional stages, inserting prior to the last expansion stage said blank, said end members, and said annular members as a unit into a one-piece tubular die chamber having an interior contour larger than said blank and said annular members but the same as the final desired external contour of said blank intermediate portion, and expanding said blank intermediate portion into engagement with said chamber during said expansional stage.

3. Apparatus for expanding a tubular blank to reduce the wall thickness thereof, said apparatus comprising a pair of rigidly connected spaced end members, the outer peripheries of said end members being shaped to fit relatively closely within the respective ends of said blank, resilient sealing means mounted on each of said peripheries and extending continuously therearound, said end members and said sealing means being inserted into said blank to a position of sealing engagement of said sealing means with the adjacent end portions respectively of said blank, restraining means mounted on the outer surface of said blank at positions juxtaposed to said sealing means respectively for restraining radial movement of said blank to maintain said sealing engagement of the blank end portions with said sealing means when said blank is expanded, means for applying force internally of said blank to expand the portion thereof intermediate of said end members, and a tubular one-piece die chamber for limiting said expansion, said die chamber being relatively larger than said blank and said restraining means, whereby said restraining means, said end members, and said blank can be inserted as a unit into said die chamber and whereby longitudinal movement of said blank ends relative to said end members and said sealing means is permitted during said expansion.

4. Apparatus for expanding a tubular blank to reduce the wall thickness thereof, said apparatus comprising a pair of rigidly connected spaced end members, the outer peripheries of said end members being shaped to fit relatively closely within the respective ends of said blank, resilient sealing means mounted on each of said peripheries and extending continuously therearound, said end members and said sealing means being inserted into said blank to a position of sealing engagement of said sealing means with the adjacent end portions respectively of said blank, a pair of closely fitting retaining rings disposed on the outer surface of said blank at positions juxtaposed to said sealing means, respectively, for maintaining said sealing engagement of the blank end portions with said sealing means when said blank is expanded, means for applying force internally of said blank to expand the portion thereof intermediate of said end members, and a one-piece tubular die chamber for limiting said expansion, said die chamber being relatively larger than said blank and said retaining rings, whereby said blank, said end members, and said retaining rings can be inserted as a unit into said die chamber, and whereby longitudinal movement of said blank ends relative to said end members and said sealing means is permitted.

References Cited in the file of this patent

UNITED STATES PATENTS

| | | |
|---|---|---|
| 788,119 | Pope | Apr. 25, 1905 |
| 1,905,584 | Giesler | Apr. 25, 1933 |
| 1,925,854 | Squires | Sept. 5, 1933 |
| 1,930,745 | Fisher | Oct. 17, 1933 |
| 2,038,304 | Middler | Apr. 21, 1936 |
| 2,214,227 | English | Sept. 10, 1940 |
| 2,334,303 | Allen et al. | Nov. 16, 1943 |
| 2,481,013 | Henderson | Sept. 6, 1949 |
| 2,631,640 | Zallea | Mar. 17, 1953 |
| 2,652,121 | Kearns | Sept. 15, 1953 |